Figure 1:
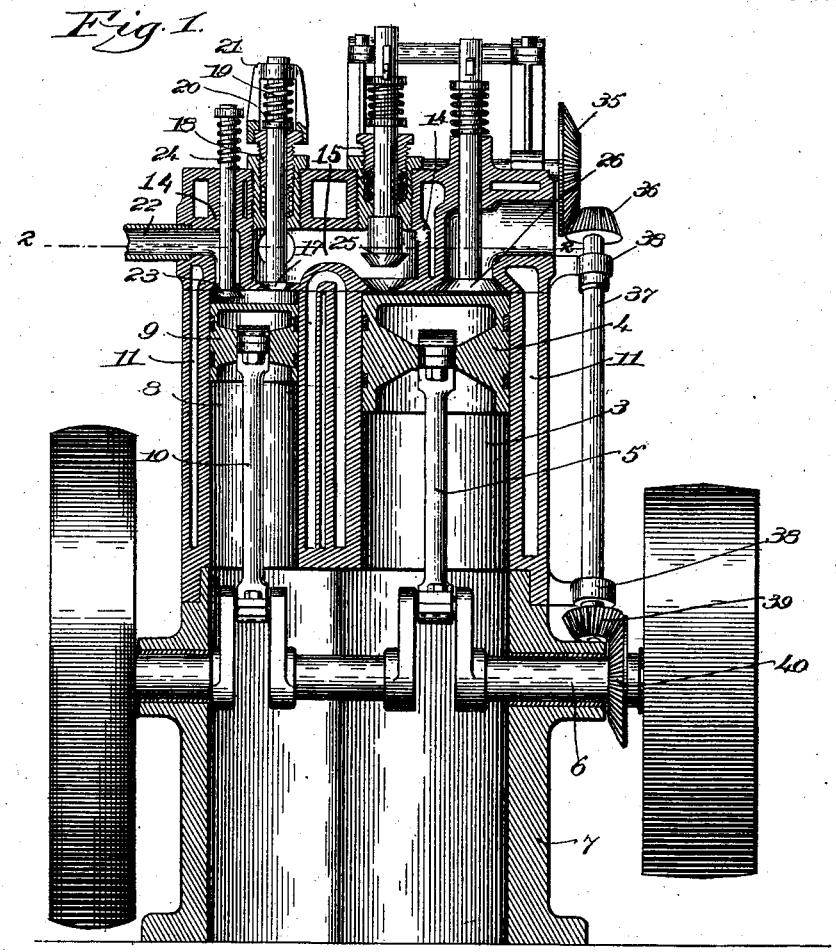

No. 708,236. Patented Sept. 2, 1902.
W. A. LEONARD.
GAS ENGINE.
(Application filed July 19, 1901.)
(No Model.) 4 Sheets—Sheet 1.

Witnesses,
Adolph Kaiser
Herman J Sartori

Inventor;
William A. Leonard,
by Crosby & Gregory
attys.

No. 708,236. Patented Sept. 2, 1902.
W. A. LEONARD.
GAS ENGINE.
(Application filed July 19, 1901.)
(No Model.) 4 Sheets—Sheet 2.
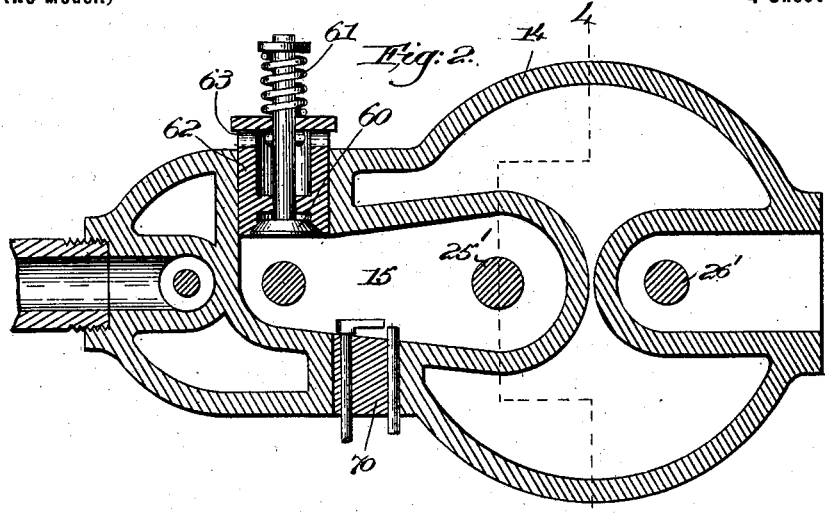
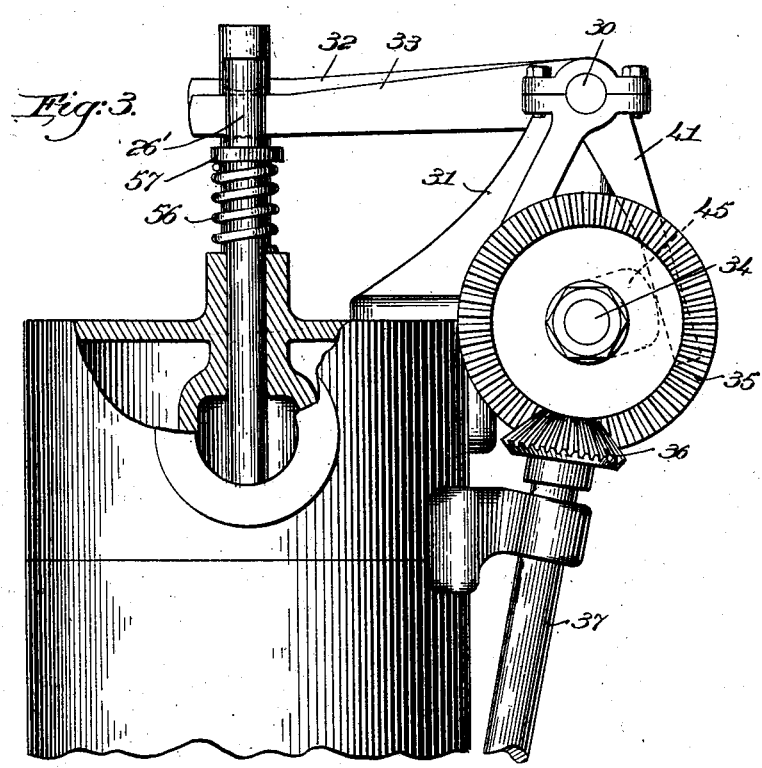

No. 708,236. Patented Sept. 2, 1902.
W. A. LEONARD.
GAS ENGINE.
(Application filed July 19, 1901.)
(No Model.) 4 Sheets—Sheet 3.
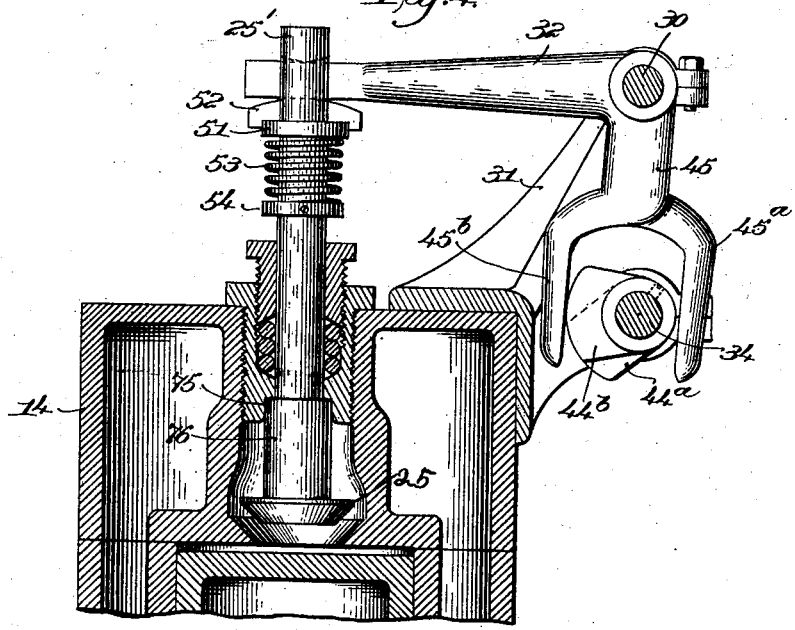
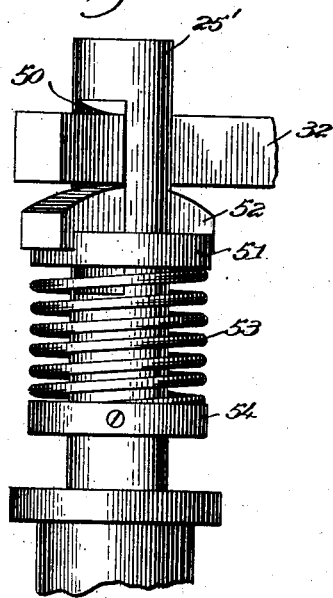
Witnesses,
Adolph H Vaisu
Herman J Sartoris
Inventor;
William A Leonard,
by Crosby Gregory
attys.

No. 708,236.  
W. A. LEONARD.  
GAS ENGINE.  
(Application filed July 19, 1901.)  
(No Model.)
Patented Sept. 2, 1902.
4 Sheets—Sheet 4.
Fig. 7.
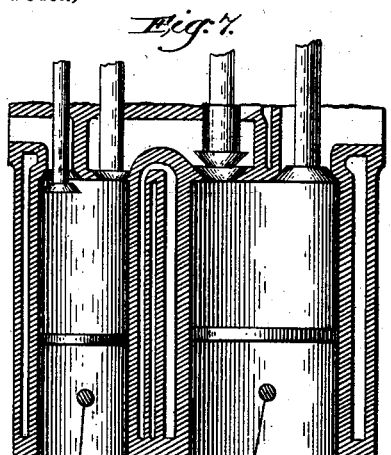
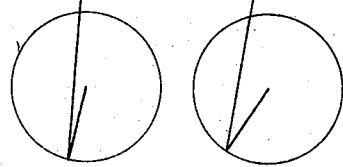
Fig. 8.
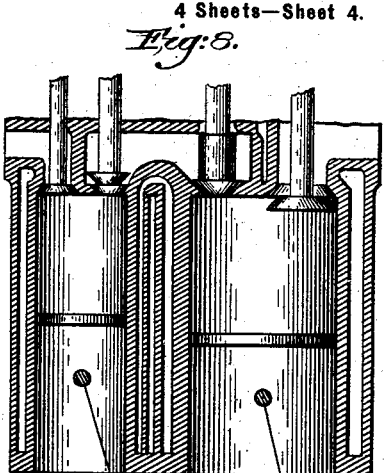
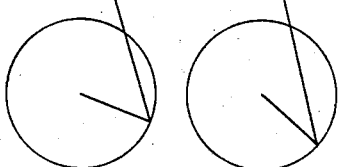
Fig. 9.
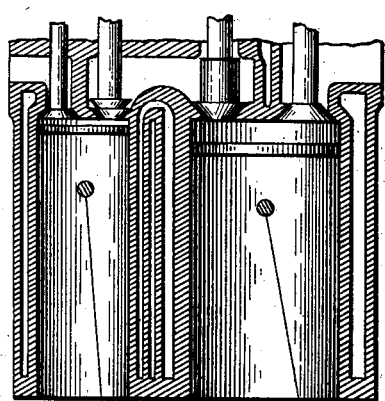
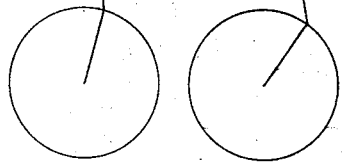
Fig. 10.
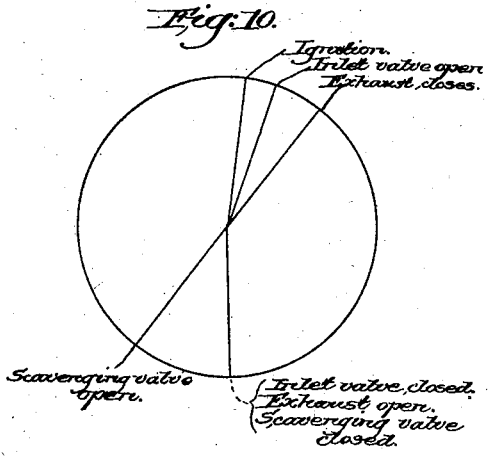
Witnesses,  
Adolph B. Kaiser  
Herman J. Sartoris
Inventor:  
William A. Leonard,  
by Crosby & Gregory  
Attys.

UNITED STATES PATENT OFFICE.

WILLIAM A. LEONARD, OF WAREHAM, MASSACHUSETTS.

GAS-ENGINE.

SPECIFICATION forming part of Letters Patent No. 708,236, dated September 2, 1902.

Application filed July 19, 1901. Serial No. 68,870. (No model.)

*To all whom it may concern:*

Be it known that I, WILLIAM A. LEONARD, a citizen of the United States, residing at Wareham, in the county of Plymouth and State of Massachusetts, have invented an Improvement in Gas-Engines, of which the following description, in connection with the accompanying drawings, is a specification, like numerals on the drawings representing like parts.

This invention relates to gas or other hydrocarbon engines in which the gas or other explosive mixture is exploded at a constant volume—*i. e.*, in which the charge of explosive gas is compressed in an ignition-chamber and then exploded suddenly, whereby the pressure of the gas is suddenly increased; and its object is to produce a two-cycle gas-engine in which the charge of combustible gas is compressed into an ignition-chamber separate from the power-cylinder and connected thereto by means of a valve connection. As the piston in the power-cylinder, which I have termed the "power-piston," reaches the end of its inward stroke the valve between the ignition-chamber and the power-cylinder is opened, and the charge of gas is exploded by suitable igniting devices, the power-piston being driven forward as usual. The ignition-chamber has an automatic scavenging-valve adapted to admit fresh air to the said chamber, and preferably the size of the power-cylinder will be so proportioned relative to the size of the ignition-chamber that after the power-piston has traveled the major portion of its stroke the ignited gases in the power-cylinder have expanded to atmospheric pressure, and during the remainder of the stroke a partial vacuum is created in the ignition-chamber and power-cylinder and a scavenging charge of fresh air is sucked or drawn through the scavenging-valve, the said charge of fresh air driving before it and expelling from the ignition-chamber into the cylinder all the burned gases. As the power-piston reaches the end of its outward stroke the inlet-valve between the ignition-chamber and the power-cylinder is closed and the exhaust-valve opened, whereby the power-piston during its inward stroke expels the burned gases.

I preferably employ in connection with my power-cylinder a pump-cylinder having a pump-piston therein, the said pump-piston serving to charge the ignition-chamber with the combustible gases previous to their being exploded. Another feature of my invention relates to the construction of the cylinder-heads for the power and pump cylinders.

I preferably arrange my cylinders side by side and provide a double cylinder-head, which forms the ends of the cylinders, the said double cylinder-head having therein the ignition-chamber, the scavenging-valve, and igniting device. The valves leading from the said chamber to either of the cylinders, the exhaust-valve from the power-cylinder, and also the inlet-valve for mixed gas and air leading into the pump-cylinder are in the face of the cylinder-heads and form part of the ends of the cylinders, by means of which construction the clearance-space between the ends of the cylinders and the pistons is reduced to a minimum.

The invention also comprises various other features, which will be hereinafter described.

Figure 6:
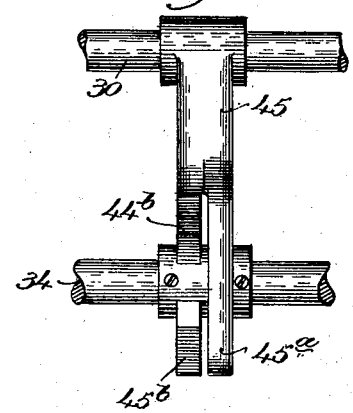

In the drawings, Figure 1 is a vertical section of my improved engine. Fig. 2 is a section on the line 2 2, Fig. 1. Fig. 3 is a detail showing the mechanism for operating the exhaust-valve. Fig. 4 is a section on the line 4 4, Fig. 2, said figure showing the mechanism for operating the inlet-valve to the power-cylinder. Figs. 5 and 6 are details of Fig. 4. Figs. 7, 8, 9, and 10 are diagrammatic views illustrating the relative positions of the pistons and valves.

The power-cylinder is designated by 3, and it has playing therein the power-piston 4, which is connected, by means of the pitman 5, to the crank-shaft 6, from which power is taken in the usual manner. The crank-shaft may be mounted in any suitable support 7, at one end of which is secured in any usual way the power-cylinder 3.

The mechanism I preferably employ for compressing the charge of gas to be exploded is a compression or pump cylinder 8, in which operates the pump-piston 9, said pump-piston being driven from the crank-shaft 6 by the usual pitman 10.

It will be understood, of course, that both the power-cylinder and the pump-cylinder will be inclosed by a suitable water-jacket 11, as usual in this class of devices.

In this embodiment of my invention I employ between the pump-cylinder and the power-cylinder a suitable chamber into which the charge of combustible gas is compressed by the pump-piston 9 and where it is ignited when the power-cylinder reaches approximately the end of its inward stroke. This intermediate chamber therefore acts both as a compression-chamber and as an ignition-chamber. I prefer to connect the intermediate chamber with each cylinder by means of valved communications, as will be presently described.

The upper ends of the cylinders have secured thereto in any suitable way the double cylinder-head 14, which contains the intermediate chamber 15, into which the charge of combustible gas is compressed and where it is ignited. The chamber 15 communicates with the pump-cylinder 8 through a suitable aperture, which is normally closed by an automatic valve 17, the stem of the valve passing through a suitable stuffing-box 18 and being held to its seat by any suitable means, such as a spring 19, which surrounds the valve-stem and engages at one end a collar 20 on the valve-stem and at the other end a yoke 21, secured to the stuffing-box. The pump-cylinder 8 also communicates with an inlet-pipe 22 through an aperture in the end of the cylinder, which is normally closed by the automatic valve 23, said valve being normally held to its seat by any usual mechanism, such as the spring 24. The pipe 22, it will be understood, connects with suitable devices for admitting gas and air mixed thereto, such devices being common in this art. The intermediate chamber 15 communicates with the power-cylinder 3 through an aperture closed by the inlet-valve 25, the stem of which passes up through a suitable stuffing-box in the cylinder-head and is connected to mechanism for positively operating the same. The exhaust-valve from the power-cylinder is designated by 26, and the stem of this valve also passes through the cylinder-head and is connected to suitable valve-operating devices. The valves leading to and from each cylinder are preferably so constructed that when they are closed the lower faces thereof are flush with and form part of the ends of the cylinders, and as the ends of the pistons are made to conform to the shape of the ends of the cylinders the clearance-space may be reduced to a minimum.

Preferably the inlet and exhaust valves 25 and 26 will be operated by mechanism connected to the crank-shaft 6 of the engine, and as one convenient form of valve-operating mechanism I have illustrated the same as comprising a shaft 30, supported in suitable brackets 31, carried by the end of the cylinder-head, the said shaft having thereon the elbow-levers 32 33, which are rocked or oscillated by means of suitable cams upon a cam-shaft 34, also supported in suitable brackets upon the cylinder-heads. The cam-shaft 34 carries at its end the gear-wheel 35, which is driven by a gear-wheel 36 on the counter-shaft 37, the said counter-shaft being journaled in any suitable bracket 38 and having at its lower end the gear-wheel 39, which meshes with and is driven by the gear-wheel 40, fast upon the crank-shaft. The inlet-valve 25 is positively operated in both directions—i. e., it is positively opened and positively closed—and to accomplish this the end of the horizontal arm of the bell-crank 32 is passed through a suitable slot 50 in the upper end of the stem 25' of the said valve, while the vertical arm 45 of said bell-crank is forked, as seen in Fig. 4, and is operated by the double cam comprising the two cam members 44$^a$ and 44$^b$. The cam member 44$^b$ engages the inner arm 45$^b$ of the bell-crank to open the valve, while the cam member 44$^a$ engages the arm 45$^a$ of the bell-crank to close the valve, as will be obvious, the two arms 44$^a$ and 44$^b$ being offset from each other, as seen in Fig. 6, so as to register with the cam members. Since the end of the horizontal arm of the bell-crank 32 has a limited up-and-down movement, it will be obvious that were the bell-crank unyieldingly connected to the stem 25' of the valve the valve would fail to close after it had operated to any appreciable extent, and to overcome this and to provide means for always firmly and surely seating the valve I provide a yielding connection between the inner end of the bell-crank and the valve-stem, and the bell-crank is given an up-and-down movement more than sufficient to seat the valve, so that the valve comes to its seat before the bell-crank reaches the lower limit of its movement, the remainder of the movement of the bell-crank being taken by the yielding connection.

As seen in Fig. 5, the slot 50 in the end of the valve-stem 25' is elongated, and passing through the same and resting at its ends upon the sliding collar 51 is a key or bearing-block 52, on which the bell-crank 32 rests, and between the sliding collar 51 and the fixed collar 54 on the valve-stem is the coiled spring or cushioning device 53. When the valve has been seated, further down movement of the horizontal arm of the bell-crank merely compresses the spring 53, as will be obvious.

The exhaust-valve 26 is in this embodiment of my invention positively opened, but is allowed to close automatically, and the said valve is operated by the bell-crank 33, oscillating upon the shaft 30, the said bell-crank having its inner end passing through a slot in the upper end of the stem 26' of the exhaust-valve. The vertical arm 41 of the bell-crank 33 is operated by the single cam 45 upon the cam-shaft 34, the said cam operating to open the valve. After the cam 45 has passed off from the arm 41 of the bell-crank the valve is closed by means of the spring 56 surrounding the valve-stem and confined between the collar 57 thereon and the cylinder-head.

Although I have described one particular form of valve-operating mechanism, yet I wish it understood that I may employ any suitable device for this purpose, it only being necessary that the inlet-valve should be positively opened and closed while the exhaust-valve should be positively opened. It will also be obvious that by making the cams for operating the valves adjustable about the shaft 30 the times of operating the valves may be varied as desired.

It is very desirable in gas-engines to completely expel the burned gases from the ignition-chamber and from the cylinder before admitting a fresh charge thereto, this process being called "scavenging." This is commonly done by admitting to the ignition-chamber the next charge of combustible gas, the combustible gas as it comes into the chamber driving before it and expelling a part of the burned gases. This manner of scavenging, however, has several disadvantages, to overcome which I have provided an engine in which the scavenging is done by a charge of fresh air, which is drawn into the ignition-chamber by the action of the piston as it reaches the end of its outward stroke, the drawing in of the charge of fresh air driving the burned gases in the ignition-chamber into the cylinder, from which they are expelled by the inward stroke of the piston. The ignition-chamber is therefore left filled with fresh air only, and the drawing in of the scavenging charge of air operates to cool the ignition-chamber, so that when the next charge of combustible gas is forced into the said chamber the dangers of premature explosions are almost entirely avoided. Looking at Fig. 2, it will be seen that the intermediate or ignition chamber 15 has communication with the outside atmosphere through a scavenging-valve 60, which is held to its seat in any suitable way, as by a spring 61. Preferably the valve will be mounted in a suitable casing, as 62, which will be screwed into an aperture in the side of the chamber 15, the said casing having the inlet-ports 63, through which air is drawn. Preferably the size of the power-cylinder 3 will be such that as the power-piston 4 moves downward on its outward stroke the ignited gases which by their expansion impel the piston will expand to about atmospheric pressure before the piston reaches the end of its stroke, and after this occurs the continued movement of the power-piston will create a partial vacuum in the power-cylinder, and air will be drawn in through the valve 60 directly into the intermediate or ignition chamber 15, the charge of fresh air driving before it and expelling into the power-cylinder all the burned gases which remain in the ignition-chamber. In order that the scavenging charge of air may not be drawn in through the exhaust-valve when the partial vacuum is created in the power-cylinder, I make the spring 56, surrounding the stem of the exhaust-valve, stronger than the spring 61, surrounding the stem of the scavenging-valve, so that as the partial vacuum is created in the power-cylinder the scavenging-valve will open against the action of its spring to allow the charge of fresh air to enter the ignition-chamber, the spring 56, surrounding the exhaust-valve stem, being sufficiently strong to prevent the said valve opening. It will be understood, of course, that the inlet-valve 25 is held open until the power-piston reaches the end of its outward stroke and the scavenging charge of air has been admitted to the ignition-chamber.

In constructing my valve 25 the same is preferably made with an enlarged stem 25' and is so constructed that the difference between the full upper area of the valve and the area of the valve-stem—i. e., the upper area which is subjected to pressure—is the same as the under area of the valve, so that when the pressure is equalized on both sides thereof the valve will be balanced. It is desirable to open the valve suddenly when the pressure on either side thereof is equalized, and in order to cushion the movement of the valve the stuffing-box is provided with a recess 75, into which the enlarged portion 76 of the valve-stem is adapted to enter, the enlarged portion 76 fitting the recess 75 like a piston and cushioning the action of the valve.

The operation of the engine will be obvious from an inspection of Figs. 7 to 10, from which it will be seen that the pump-crank is set in advance of the power-crank approximately twenty-five degrees. Fig. 1 shows the position of the parts just as the power-piston has reached the inward end of its stroke, and it will be seen that the pump-piston, which is slightly in advance of the power-piston, has started on its downstroke and has begun to draw in the charge of mixed air and gas into the pump-cylinder, the valve 23 opening automatically to admit the gas. When the parts are in this position, the inlet-valve 25 will be opened and the exhaust-valve 26 closed, and the charge of gas and air which has been compressed into the intermediate chamber 15 by the previous stroke of the pump has just been ignited by suitable igniting devices, (shown at 70.) The valve 17 of course will be held to its seat both by the spring 19 and by the pressure of the gas in the ignition-chamber, and the scavenging-valve 60 will also be held to its seat in the same way. The power-piston is impelled forward by the force of the ignited gas until the parts have reached approximately the position shown in Fig. 7. In the ordinary running of the engine the charge of gas admitted to the ignition-chamber bears such a relation to the size of the power-cylinder 3 that when the parts have reached approximately the position shown in Fig. 7 the ignited gases behind the piston have expanded to about atmospheric pressure, and any further downward movement of the power-piston creates sufficient vacuum in the power-cylinder to open the scavenging-valve 60 and draw fresh air into the intermediate chamber 15, the charge of fresh air expelling the burned gases into the power-cylinder, as above explained. During this operation the inlet-valve 25 is still held open, as shown in Fig. 7, and the pump-piston is still drawing the charge of gas and air into the pump-cylinder. When the pump-piston reaches the end of its outward stroke and begins the return stroke, it begins to compress the gas in the pump-cylinder, and by the time the gas is compressed sufficiently to overcome the resistance of the spring 19, which holds the valve 17 to its seat, the crank of the power-piston has passed the dead-center and has begun its return stroke. When this occurs, the inlet-valve 25 is closed and the exhaust-valve 26 is opened by the valve-operating mechanism, and during the first part of the return stroke the burned gases are being expelled from the power-cylinder, while the next charge of mixed gas and air is being forced into the intermediate chamber, as seen in Fig. 8. When the parts reach approximately the position shown in Fig. 9, the cam 45 has passed off from the arm 41 and allowed the exhaust-valve to close, and during the remainder of the stroke the burned gases that still remain in the cylinder are compressed to cushion the power-piston, and it is my intention to so construct the valve-operating mechanism that the inlet-valve 25 will open about the time when the pressure of the gases remaining in the power-cylinder is equal to the pressure of the charge of gas in the intermediate chamber 15. When this occurs, the valve 25 will be balanced and will require but a slight force to open the same. During the next rotation of the crank-shaft the same operation is repeated, and with the result that an impulse is given to the piston at each outward stroke thereof. The diagram in Fig. 10 shows approximately the angular positions of the power-crank when the different steps outlined above take place.

I intend to so construct my engine that when the engine is carrying its maximum load the ignited gases will expand to atmospheric pressure at the points indicated in the drawings; but it will be understood, of course, that when the load of the engine is decreased some suitable governor will be employed to admit a smaller charge of gas to the ignition-chamber, in which case, of course, the point where the burned gases will expand to atmospheric pressure in the power-cylinder will be reached before that indicated in the drawings. The only result of this will be that a larger volume of fresh air will be drawn through the scavenging-valve into the ignition-chamber and also into the power-cylinder, and on the return stroke of the power-piston such air will be exhausted with the burned gases.

From the above it will be seen that I have devised a novel form of two-cycle gas-engine wherein the scavenging is done by a charge of fresh air which is drawn into the ignition-chamber by means of the power-piston just as it reaches the end of its outward stroke. By means of this construction the pressure in the power-cylinder when the exhaust-valve opens is approximately the same as atmospheric pressure, so that I not only obtain the full benefit of the entire expansion of the ignited gases, but also obviate the loud noise incident to exhausting the gases which are above atmospheric pressure, as is common in most types of gas-engines. Furthermore, by my particular construction of double cylinder-heads, in which the valves form a portion of the ends of the cylinders, the clearance-space necessary in each of the cylinders is reduced to a minimum.

I desire it to be understood that various changes may be made in the construction of my device without departing from the spirit of my invention.

While the double-head cylinder is shown as a single casting, yet it may be constructed in sections securely fastened together, if desired, without departing from the spirit of my invention.

Having described my invention, what I claim, and desire to secure by Letters Patent, is—

1. In a gas-engine, a power-cylinder, a pump-cylinder, a single cylinder-head for both said cylinders, an inlet-port leading through the cylinder-head and opening into the end of the pump-cylinder, an exhaust-port for the power-cylinder also extending through the cylinder-head, an ignition-chamber in said cylinder-head and having communication with each cylinder, a puppet-valve controlling the inlet-port to the pump-cylinder, a second puppet-valve controlling the exhaust from the power-cylinder, a third puppet-valve controlling the communication between the pump-cylinder and the ignition-chamber, and a fourth puppet-valve controlling the inlet between the ignition-chamber and power-cylinder, all of said valves being carried by and operating in the cylinder-head and each of said valves being independent from the others and when closed having its face flush with and constituting part of the end of the cylinder, positive valve-actuating mechanism for the valve controlling the inlet to the power-cylinder and that controlling the exhaust therefrom, said mechanism operating to close the inlet-valve at the finish of the outward stroke of the power-piston, and also operating to close the valve in the exhaust-port before the power-piston reaches the end of its inward stroke, whereby the gases remaining in the power-cylinder are compressed to substantially the same pressure as the charge of air and gas in the ignition-chamber.

2. In a gas or other hydrocarbon engine, a power-cylinder, a piston therein, an ignition-chamber separate from, but having a valved connection with the cylinder, means to admit a charge of gas to said ignition-chamber and means to explode the same at each outward stroke of the piston, and means to admit a scavenging charge of fresh air directly to said ignition-chamber during the latter part of each outward stroke.

3. In a gas or other hydrocarbon engine, a power-cylinder, a piston therein, an ignition-chamber connected to said cylinder but separate therefrom, a valve controlling the communication between the ignition-chamber and cylinder, means to admit a charge of gas to said chamber at each inward stroke of the engine, igniting devices, and means to admit a scavenging charge of fresh air directly to said ignition-chamber during the latter part of each outward stroke.

4. In a gas-engine, a power-cylinder, an ignition-chamber separate from said cylinder and connected thereto, an inlet-valve between said cylinder and chamber, an automatic scavenging-valve to admit fresh air directly to said chamber, the relation between the parts being such that during the latter part of each outward stroke a partial vacuum is created in the power-cylinder and fresh air is drawn directly into the ignition-chamber through the scavenging-valve.

5. In a two-cycle gas-engine, a power-cylinder, a piston therein, an ignition-chamber connected to the cylinder, means to admit a charge of gas to said chamber, means to ignite the same slightly before, or during, the early part of each outward stroke of the piston, combined with a spring-controlled scavenging-valve leading to said chamber and adapted to admit fresh air directly into the latter, the piston operating at the end of each outward stroke to create a partial vacuum in the cylinder and draw fresh air directly into the ignition-chamber through the scavenging-valve.

6. In a two-cycle gas-engine, a power-cylinder, a piston therein, a pump-cylinder and its coöperating piston, a chamber between said cylinders, a valve between each cylinder and the chamber, and a scavenging-valve to admit fresh air to said chamber, the parts being so disposed that the pump-piston operates to force a charge of compressed gas into the chamber where it is ignited, the ignited gas operating on the power-piston to give an impulse to the same, and the said piston operating to create a partial vacuum in the cylinder and draw a scavenging charge of fresh air into the chamber through the scavenging-valve.

7. In a gas or other engine, a power-cylinder, a piston therein, a pump-cylinder and piston, a chamber between said cylinders, an automatic valve between the chamber and pump-cylinder, a positively-operated inlet-valve between the chamber and the power-cylinder, and an automatic scavenging-valve to admit fresh air directly to said chamber, the parts being so disposed that on each inward stroke of the pump-piston a charge of gas is compressed in the chamber, and as the power-piston reaches the end of its inward stroke the inlet-valve is opened and the charge ignited, the power-piston during the latter part of its stroke operating to create a partial vacuum in the power-cylinder, and draw a scavenging charge of fresh air directly into the chamber.

8. In a gas-engine, a power-cylinder, a piston therein, a pump-cylinder and its piston, a chamber between said cylinders, an automatic valve between the chamber and the pump-cylinder, an inlet-valve between the chamber and the power-cylinder, and an exhaust-valve, said valves being independent from each other, valve-actuating mechanism operating to close the exhaust-valve before the power-piston reaches the end of its inward stroke, whereby the said piston is cushioned, and to open the inlet-valve and admit the compressed gases in the chamber into the power-cylinder, said inlet-valve remaining open until the piston reaches the end of its outward stroke, an automatic valve to admit fresh air directly to the chamber, the piston during the latter part of its stroke creating a partial vacuum in the power-cylinder and drawing a scavenging charge of air into the chamber, said scavenging charge remaining in the chamber during the exhaust.

9. In a gas-engine, a power-cylinder, a piston therein, an ignition-chamber separate from said cylinder but connected thereto, an inlet-valve between the chamber and said cylinder, valve-operating mechanism, said cylinder having an exhaust-valve, means to compress a charge of explosive gas in said chamber and ignite the same, said explosive gas impelling the piston forward, and means whereby the piston during the latter part of its outward stroke draws a scavenging charge of fresh air into said chamber, said inlet-valve being closed as the piston begins its inward or return stroke, whereby the burned gases are expelled through the exhaust-valve and the scavenging charge of fresh air remains in the cylinder.

10. In a two-cycle gas-engine, a power-cylinder, a piston therein, an ignition-chamber connected to the cylinder, an inlet-valve between the chamber and cylinder, valve-operating mechanism, an exhaust-valve leading from the said cylinder, means to admit a charge of gas to said chamber, means to ignite the same slightly before or during the early part of each outward stroke of the piston, combined with a spring-controlled scavenging-valve leading to said chamber and operating to admit fresh air directly into the latter, the piston operating at the latter part of its outward stroke to create a partial vacuum in the cylinder and draw fresh air directly into the ignition-chamber through the scavenging-valve, and said inlet-valve closing as the piston begins its return stroke, whereby the burned gases are expelled through the exhaust-valve while a scavenging charge of air remains in the said chamber.

11. In a two-cycle gas-engine, a power-cylinder, a piston therein, a pump-cylinder and its coöperating piston, a chamber between said cylinders, a valve between the pump-cylinder and the chamber, and an inlet-valve between the power-cylinder and the chamber, an exhaust-valve leading from the said power-cylinder, a scavenging-valve to admit fresh air directly to said chamber, and valve-operating mechanism, the parts being so disposed that the pump-piston operates to force a charge of compressed gas into the chamber where it is ignited, the ignited gas operating on the power-piston to give an impulse to the same, the said power-piston operating during the latter portion of its outward stroke to create a partial vacuum in the said cylinder and draw a scavenging charge of fresh air into the chamber through the scavenging-valve, and the inlet-valve closes when the power-piston has reached the limit of its outward stroke, whereby the burned gases are expelled through the exhaust-valve, while the scavenging charge of fresh air remains in the said chamber.

12. In a gas or other engine, a power-cylinder, a piston therein, a pump-cylinder and its coöperating piston, a chamber between said cylinders, an automatic valve between the chamber and pump-cylinder, a positively-operated inlet-valve between the chamber and the power-cylinder, an exhaust-valve for the power-cylinder, valve-operating mechanism for the inlet and exhaust valves, and an automatic scavenging-valve to admit fresh air directly to said chamber, the parts being so disposed that as the power-piston reaches the end of its inward stroke the inlet-valve is opened and the charge ignited, and as the power-piston reaches the end of its outward stroke the said inlet-valve is closed, the power-piston during the latter part of its outward stroke operating to create a partial vacuum in the power-cylinder and draw a scavenging charge of fresh air directly into the chamber, and during its return stroke operating to expel the burned gases from the cylinder, the scavenging charge of air remaining in the chamber.

In testimony whereof I have signed my name to this specification in the presence of two subscribing witnesses.

WILLIAM A. LEONARD.

Witnesses:
 LOUIS C. SMITH,
 GEO. W. GREGORY.

Correction in Letters Patent No. 708,236.

It is hereby certified that in Letters Patent No. 708,236, granted September 2, 1902, upon the application of William A. Leonard, of Wareham, Massachusetts, for an improvement in "Gas-Engines," an error appears in the printed specification requiring correction, as follows: In line 115, page 5, the word "cylinder" should read *chamber;* and that the said Letters Patent should be read with this correction therein that the same may conform to the record of the case in the Patent Office.

Signed and sealed this 9th day of September, A. D., 1902.

[SEAL.]

F. I. ALLEN,
*Commissioner of Patents.*